(12) United States Patent
Kowalevicz et al.

(10) Patent No.: US 11,199,754 B2
(45) Date of Patent: Dec. 14, 2021

(54) DEMODULATOR WITH OPTICAL RESONATOR

(71) Applicant: Raytheon Company, Waltham, MA (US)

(72) Inventors: Andrew M. Kowalevicz, Arlington, VA (US); Benjamin P. Dolgin, Alexandria, VA (US); Gary M. Graceffo, Burke, VA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/903,129

(22) Filed: Jun. 16, 2020

(65) Prior Publication Data

US 2021/0018817 A1   Jan. 21, 2021

Related U.S. Application Data

(60) Provisional application No. 62/874,156, filed on Jul. 15, 2019.

(51) Int. Cl.
| | |
|---|---|
| *G02F 2/00* | (2006.01) |
| *H04B 10/556* | (2013.01) |
| *H04B 10/67* | (2013.01) |
| *H04B 10/11* | (2013.01) |
| *H04B 10/516* | (2013.01) |

(52) U.S. Cl.
CPC ............... *G02F 2/00* (2013.01); *H04B 10/11* (2013.01); *H04B 10/516* (2013.01); *H04B 10/5561* (2013.01); *H04B 10/671* (2013.01); *H04B 10/677* (2013.01); *G02F 2203/15* (2013.01)

(58) Field of Classification Search
CPC ....... G02F 2/00; G02F 2203/15; H04B 10/11; H04B 10/516; H04B 10/671; H04B 10/5561; H04B 10/677; H04B 10/676; G02B 17/004
USPC .......................................................... 359/326
See application file for complete search history.

(56) References Cited

U.S. PATENT DOCUMENTS

| | | | |
|---|---|---|---|
| 5,625,633 A * | 4/1997 | Ichimura | .................. G02F 1/37 372/32 |
| 7,822,081 B2 * | 10/2010 | Vilhelmsson | ........... H01S 5/142 372/20 |
| 9,954,618 B1 * | 4/2018 | Dong | ................. H04B 10/5057 |

(Continued)

*Primary Examiner* — Abbas H Alagheband (74) *Attorney, Agent, or Firm* — Schwegman Lundberg & Woessner, P.A, (57) ABSTRACT

A demodulator can include an optical resonator. The optical resonator can include a resonant cavity that extends between a first surface that is partially reflective and a second surface that is at least partially reflective. The first surface can receive a phase-modulated optical signal that has a time-varying phase. The resonant cavity can accumulate resonant optical signal energy based at least in part on the phase-modulated optical signal. The first surface can direct a fraction of the resonant optical signal energy out of the optical resonator to form an intensity-modulated optical signal that has a time-varying intensity. A data detector can receive at least a portion of the intensity-modulated optical signal and, in response, generate an intensity-modulated electrical signal that has a time-varying intensity that corresponds to the time-varying phase of the phase-modulated optical signal.

19 Claims, 4 Drawing Sheets

(56) References Cited

U.S. PATENT DOCUMENTS

| | | | |
|---|---|---|---|
| 10,088,670 B1* | 10/2018 | Hester | F16H 21/44 |
| 2005/0018276 A1* | 1/2005 | Kourogi | G02F 1/21 |
| | | | 359/333 |
| 2013/0308136 A1* | 11/2013 | Kuznetsov | H01S 5/142 |
| | | | 356/479 |
| 2014/0240711 A1* | 8/2014 | Matsushita | G01J 3/26 |
| | | | 356/451 |
| 2018/0054259 A1* | 2/2018 | Kowalevicz | H04B 10/25 |
| 2018/0091228 A1* | 3/2018 | Kowalevicz | G02B 5/28 |
| 2018/0091232 A1* | 3/2018 | Dolgin | H01S 3/08031 |

* cited by examiner

DEMODULATOR WITH OPTICAL RESONATOR

CROSS-REFERENCE TO RELATED APPLICATION

This application claims the benefit of U.S. Provisional Application No. 62/874,156, filed on Jul. 15, 2019, which is incorporated by reference herein in its entirety.

FIELD OF THE DISCLOSURE

The present disclosure relates generally to a demodulator that can demodulate a phase-modulated optical signal.

BACKGROUND OF THE DISCLOSURE

It is possible to encode a data stream onto an optical beam, such as by modulating a phase of the optical beam. An example of a phase-modulation scheme is quadrature amplitude modulation (QAM). For example, QAM schemes can include 16-QAM, 64-QAM, 256-QAM, and more generally, $2^n$-QAM, where quantity n is an integer. Another example of a phase-modulation scheme is phase-shift keying (PSK). Special cases of phase-shift keying (PSK) can include binary phase shift keying (BPSK) and quadrature phase shift keying (QPSK).

SUMMARY

In an example, a demodulator can include: an optical resonator comprising a resonant cavity that extends between a first surface that is partially reflective and a second surface that is at least partially reflective, the optical resonator configured to: receive, through the first surface, a phase-modulated optical signal that has a time-varying phase; accumulate resonant optical signal energy inside the resonant cavity based at least in part on the phase-modulated optical signal; and direct, through the first surface, a fraction of the resonant optical signal energy out of the resonant cavity to form an intensity-modulated optical signal that has a time-varying intensity that corresponds to the time-varying phase of the phase-modulated optical signal; and a data detector configured to receive at least a portion of the intensity-modulated optical signal and, in response, generate an intensity-modulated electrical signal that has a time-varying intensity that corresponds to the time-varying phase of the phase-modulated optical signal.

In an example, a method for demodulating a phase-modulated optical signal that has a time-varying phase can include: receiving the phase-modulated optical signal through a partially reflective first surface of an optical resonator, the optical resonator including a resonant cavity that extends between the first surface and an at least partially reflective second surface; accumulating resonant optical signal energy inside the resonant cavity based at least in part on the phase-modulated optical signal; directing a fraction of the resonant optical signal energy out of the resonant cavity through the first surface to form an intensity-modulated optical signal that has a time-varying intensity that corresponds to the time-varying phase of the phase-modulated optical signal; and receiving at least a portion of the intensity-modulated optical signal with a data detector and, in response, generating an intensity-modulated electrical signal that has a time-varying intensity that corresponds to the time-varying phase of the phase-modulated optical signal.

In an example, a demodulator can include: an optical resonator comprising a resonant cavity that extends between a first surface that is partially reflective and a second surface that is at least partially reflective, the optical resonator configured to: receive, through the first surface, a phase-modulated optical signal that has a time-varying phase; accumulate resonant optical signal energy inside the resonant cavity based at least in part on the phase-modulated optical signal; cause the resonant optical signal energy to approach a steady-state energy value; vary the resonant optical signal energy away from the steady-state energy value in response to a variation in the phase of the phase-modulated optical signal; direct, through the first surface, a fraction of the resonant optical signal energy out of the resonant cavity to form an intensity-modulated optical signal that has a time-varying intensity that corresponds to the time-varying phase of the phase-modulated optical signal; and after the phase of the phase-modulated optical signal has varied, resonant optical signal energy to approach a steady-state energy value; a data detector configured to receive at least a portion of the intensity-modulated optical signal and, in response, generate an intensity-modulated electrical signal that has a time-varying intensity that corresponds to the time-varying phase of the phase-modulated optical signal; and detection circuitry configured to: receive at least a portion of the intensity-modulated electrical signal; and identify the variation in the phase of the phase-modulated optical signal based at least in part on the time-varying intensity of the intensity-modulated electrical signal.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting in any manner.

DETAILED DESCRIPTION

A phase-modulated optical signal can be formed as a data signal that is encoded onto an optical beam. The (unencoded) optical beam can have a time-invariant or relatively slowly-varying intensity or amplitude. Encoding the data signal onto the optical beam can impart a time-varying phase variation onto the optical beam according to a modulation scheme to provide a data stream at a data rate. Example of modulation schemes can include $2^n$-QAM, PSK, BPSK, QPSK, and others.

A demodulator can extract the data stream from the phase-modulated optical signal. For example, the demodulator can convert the phase-varying phase-modulated optical signal to an intensity-modulated optical beam that has an intensity variation that corresponds to the phase variation.

The demodulator can direct the intensity-modulated optical beam onto a detector to produce an amplitude-modulated electrical signal that has an amplitude modulation that corresponds to the optical intensity variation, which in turn corresponds to the optical phase variation. A processor or other suitable circuitry can detect times at which the amplitude-modulated electrical signal crosses zero (or crosses another suitable threshold value) and extract the data stream from the detected times.

In the demodulator discussed in detail below, the demodulation scheme can make use of transient effects that deviate from steady-state values. For example, the optical resonator can build up energy in the resonant cavity to achieve a steady-state level of energy inside the resonant cavity. If the phase of the phase-modulated optical signal were left unmodulated, a level of optical power exiting the resonant cavity would remain constant over time at a steady-state optical power level. As the phase of the phase-modulated optical signal varies from one phase to another, according to the modulation scheme, the variation in phase can cause a transient spike or dip in the level of optical power exiting the resonant cavity. The transient spike or dip can subside relatively quickly, and the level of optical power exiting the resonant cavity can return to the steady-state optical power level before the next variation in phase in the phase-modulated optical signal. The transient spikes or dips in optical power can occur at times that correspond to the times at which the phase is varied in the phase-modulated optical signal. A detector can convert the transient spikes or dips in optical power to an electrical signal that includes the transient spikes or dips as spikes or dips in voltage or current. By sensing the times at which the spikes or dips in voltage or current occur, a processor or other suitable circuitry can extract the data stream.

In an example, a demodulator can include an optical resonator. The optical resonator can include a resonant cavity that extends between a first surface that is partially reflective and a second surface that is at least partially reflective. The first surface can receive a phase-modulated optical signal that has a time-varying phase. The resonant cavity can accumulate resonant optical signal energy based at least in part on the phase-modulated optical signal. The first surface can direct a fraction of the resonant optical signal energy out of the resonant cavity to form an intensity-modulated optical signal that has a time-varying intensity. A data detector can receive at least a portion of the intensity-modulated optical signal and, in response, generate an intensity-modulated electrical signal that has a time-varying intensity that corresponds to the time-varying phase of the phase-modulated optical signal.

Figure 1:
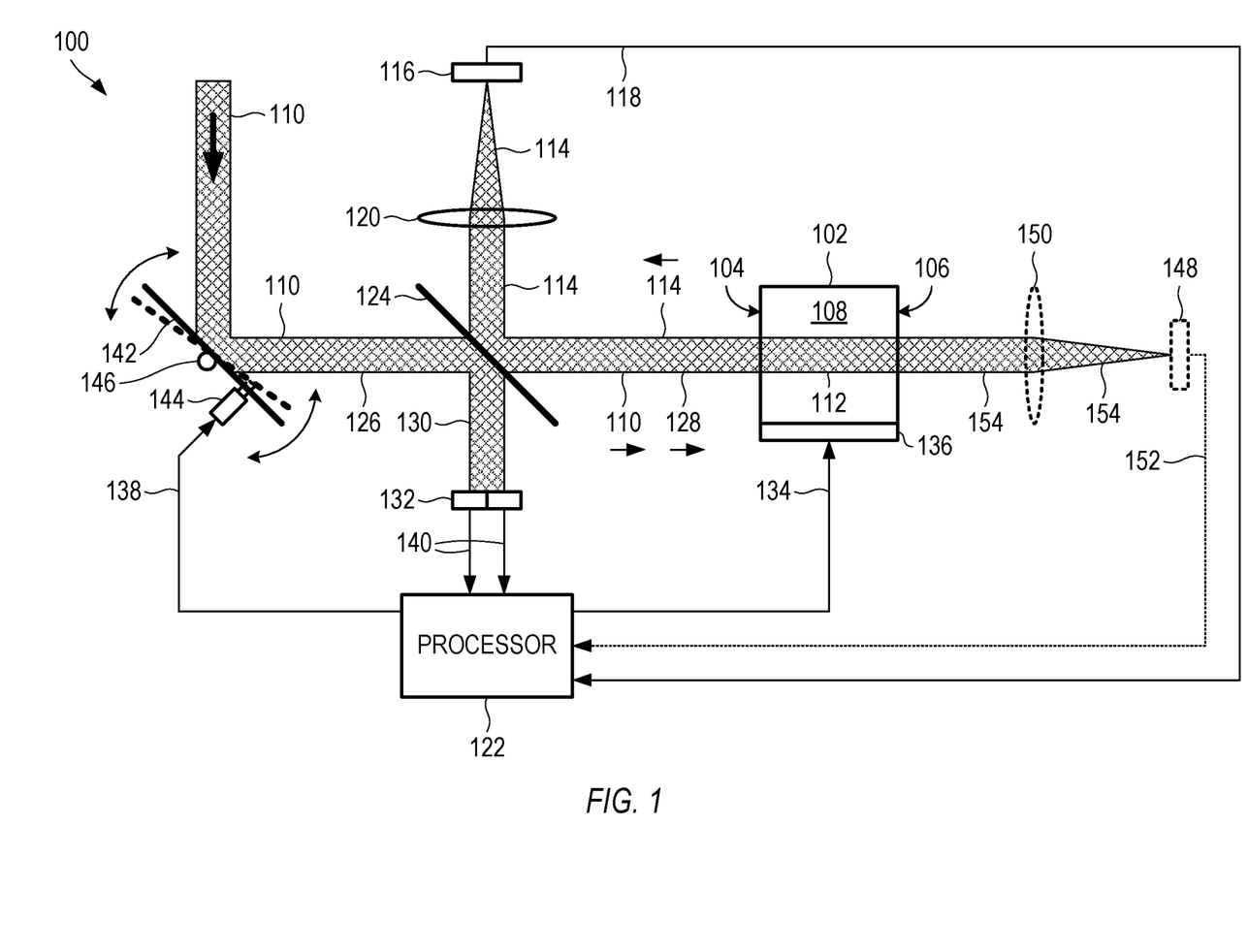
FIG. 1 shows an example of a demodulator, in accordance with some embodiments.

FIG. 1 shows an example of a demodulator 100, in accordance with some embodiments. The configuration of FIG. 1 is but one example of a demodulator 100; other suitable configurations can also be used.

The demodulator 100 can include an optical resonator 102. The optical resonator 102 can include a resonant cavity that extends between a first surface 104 that is partially reflective (e.g., having a power reflectivity of about 80%, about 85%, about 90%, about 95%, about 99%, in the range of about 35% to about 65%, or another suitable power reflectivity value) and a second surface 106 that is at least partially reflective (e.g., partially or substantially fully reflective, for example, having a power reflectivity of about 80%, about 85%, about 90%, about 95%, about 99%, about 100%, in the range of about 35% to about 65%, or another suitable power reflectivity value). For example, the optical resonator 102 can be formed as an etalon. The etalon can be formed from a suitable material 108 that can be optically transparent at a wavelength of the phase-modulated optical signal, such as silicon, for a wavelength of 1550 nm. Other suitable materials 108 and wavelengths can also be used. As another example, the optical resonator 102 can be formed as a length of optical fiber, which has longitudinal ends that can function as the first surface 104 and the second surface 106. Other suitable optical resonator structures can also be used.

It is found that the effectiveness of the demodulator 100 can vary as a function of a round-trip optical path length of the optical resonator 102. For example, for BPSK modulation, the demodulator 100 can operate most effectively when the optical resonator 102 can have a round-trip optical path length that equals or substantially equals a multiple of a wavelength of the phase-modulated optical signal. For QPSK modulation or QAM modulation, the demodulator 100 can operate most effectively when the optical resonator 102 can have a round-trip optical path length that differs from a multiple of a wavelength of the phase-modulated optical signal. In some examples, the round-trip target path length value can differ from a multiple of the wavelength of the incident beam by less than about three-eighths of the wavelength. In some examples, the round-trip target path length value can differ from a multiple of the wavelength of the incident beam by about one-fourth of the wavelength. In some example, the difference from the multiple of the wavelength can be independent of a data rate of the phase-modulated optical signal.

The optical resonator 102 can receive, through the first surface 104, a phase-modulated optical signal 110 that has a time-varying phase. The optical resonator 102 can accumulate resonant optical signal energy 112 inside the optical resonator 102 based at least in part on the phase-modulated optical signal 110. The optical resonator 102 can direct, through the first surface 104, a fraction of the resonant optical signal energy 112 out of the optical resonator 102 to form an intensity-modulated optical signal 114 that has a time-varying intensity that corresponds to the time-varying phase of the phase-modulated optical signal 110.

As explained above, the optical resonator 102 can use transient effects to generate the intensity-modulated optical signal 114. For example, the optical resonator 102 can cause an intensity of the intensity-modulated optical signal 114 to approach a steady-state intensity value. The optical resonator 102 can vary the intensity of the intensity-modulated optical signal 114 away from the steady-state intensity value in response to a variation in the phase of the phase-modulated optical signal 110. After the phase of the phase-modulated optical signal 110 has varied (e.g. has switched from a first phase value to a second phase value different from the first phase value), the optical resonator 102 can cause the intensity-modulated optical signal 114 to approach the steady-state intensity value.

A data detector 116 can receive at least a portion of the intensity-modulated optical signal 114 and, in response, generate an intensity-modulated electrical signal 118 that has a time-varying intensity that corresponds to the time-varying phase of the phase-modulated optical signal 110. The data detector 116 can have a bandwidth that is greater than a data rate of the phase-modulated optical signal 110. Because detector bandwidths can scale inversely with detector size, a focusing lens 120 can focus the portion of the intensity-modulated optical signal 114 to a relatively small size, so as to fit the focused portion onto a relatively small data detector 116 with a relatively large bandwidth. The data detector 116 can be formed from a material that is responsive at the wavelength of the phase-modulated optical signal 110, such as silicon, for a wavelength of 1550 nm. Other detector materials and wavelengths can also be used.

Detection circuitry, such as in a processor 122, can receive at least a portion of the intensity-modulated electrical signal 118, and identify the variation in the phase of the phase-modulated optical signal 110 based at least in part on the time-varying intensity of the intensity-modulated electrical signal 118. The detection circuitry can be included with hardware (e.g., as a stand-alone circuit), in software (e.g., executed as a program on one or more processors), or can be a combination of hardware and software.

In some examples, the detection circuitry can perform threshold detection to the intensity-modulated electrical signal 118 to determine a data stream that has been encoded on the phase-modulated optical signal 110. For example, the threshold detection can include determining times at which the intensity-modulated electrical signal 118 crosses a specified threshold voltage or threshold current (e.g., increases from below the threshold to above the threshold, or decreases from above the threshold to below the threshold). In some examples, the determined times can be aligned to a clock that includes specified time windows, such that the threshold detection can determine if the intensity-modulated electrical signal 118 crosses the threshold voltage or the threshold current within each of the specified time windows. The times at which intensity-modulated electrical signal 118 crosses a specified threshold voltage or threshold current can correspond to a specified encoding and/or decoding algorithm, which can in turn provide the data stream that has been encoded on phase-modulated optical signal 110.

Using threshold detection with the hardware configuration shown in FIG. 1 can provide several benefits. A first benefit can include improving a sensitivity of a receiver that includes the demodulator 100 of FIG. 1. For example, because the signals exit the optical resonator 102 in a reflected mode, the signals can have a maximum amplitude or maximum intensity that can be about twice as large as the amplitude or intensity of a signal that enters the optical resonator 102. Compared with a configuration in which the optical resonator 102 is used in a transmission mode, where the signals can have a maximum amplitude or maximum intensity that can be about as large as the amplitude or intensity of the signal that enters the optical resonator 102, operating in reflection can provide an increase of about a factor of two for signal amplitude, which can in turn lead to more robust threshold detection. Further, this increase in signal amplitude can be achieved without increasing a complexity of the demodulator 100 of FIG. 1. A second benefit can include simplified demodulation for specific encoding formats. For example, a non-return-to-zero inverted (NRZI) line code, which is used commercially in delivery of high-definition video, is particularly well-suited for threshold detection using the demodulator 100 of FIG. 1. In other words, a receiver that employs threshold detection with the hardware configuration of the demodulator 100 of FIG. 1 can be simpler, and therefore less expensive, than comparable receivers that employ more complex decoding techniques or require more complex hardware to decode optical signals that have been encoded with certain encoding schemes, such as NRZI. Other established encoding formats can also be used with threshold detection in the demodulator 100 of FIG. 1. A third benefit can include simplifying the hardware required to achieve a desired sensitivity. For example, the demodulator 100 of FIG. 1, when operated in reflection mode, can achieve a particular sensitivity using single-ended detection (e.g., a signal from one detector). The single-ended detection is simpler and less expensive than using balanced detection, which uses signals from two detectors at an added complexity and an increased cost. The single-ended detection is also simpler and less expensive than coherent detection. Other benefits are also possible.

A beamsplitter 124 can receive an incident beam 126 and direct a first portion 128 of the incident beam 126 to the optical resonator 102 as the phase-modulated optical signal 110. The beamsplitter 124 can be formed as a plate beamsplitter 124 (e.g., having two generally parallel sides that are both angled with respect to the incident beam), a cube beamsplitter 124 (e.g., having two triangular prisms in contact at their respective hypotenuses, and a partially reflective coating disposed between the triangular prisms), or another suitable configuration. The beamsplitter 124 can optionally be a polarizing or polarization-sensitive beamsplitter, which can reflect most or all of a first polarization orientation and can transmit most or all of a second polarization orientation that is orthogonal to the first polarization orientation. Using such a polarizing beamsplitter, in combination with one or more optical elements that can rotate a plane of polarization, such as a quarter-wave plate or a Faraday rotator, can improve the efficiency of the optical path of the demodulator 100.

The beamsplitter 124 can direct a second portion 130 of the incident beam 126 to a control signal detector 132. The control signal detector 132 can have a bandwidth that is less than a bandwidth of the data detector 116. The control signal detector 132 can be a control signal detector 132, such as a quadrant detector. Other configurations can also be used. The control signal detector 132 can perform two functions.

In a first function, the control signal detector 132 (and/or the processor 122) can generate an optical path length control signal 134 that corresponds to a total optical power incident on the control signal detector 132. The control signal detector 132 can direct the optical path length control signal 134 to an optical path length adjuster 136. The optical path length adjuster 136 can control an optical path length of the optical resonator 102, based at least in part on the optical path length control signal 134.

To generate the control signal detector 132, the processor 122 can monitor an amplitude (or another characteristic) of the intensity-modulated electrical signal 118, and, based on information obtained from the intensity-modulated electrical signal 118, optionally in combination with information obtained from the processor 122. In some examples, the processor 122 can use a sample of the phase-modulated optical signal 110 in combination with information about the intensity-modulated electrical signal 118 (e.g., its peak voltage, its peak current, its peak-to-valley voltage, and/or its peak-to-valley current) to produce the optical path length control signal 134. Thus, the processor 122 can responsively provide the optical path length control signal 134 to tune the optical resonator 102 to optimize the operating point.

In addition, the processor 122 can tune the optical resonator 102 relatively quickly, which can correct for changing characteristics of the phase-modulated optical signal 110 and/or small variations in the propagation direction of the phase-modulated optical signal 110. Thus, the processor 122 can tune the optical resonator 102 to maintain any desired operating point. In addition, the processor 122 can tune the optical resonator 102 from signal to signal, for example, to optimize the intensity-modulated electrical signal 118 over a range of time-varying operating conditions. In some examples, the processor 122 can tune the optical resonator 102 to optimize the intensity-modulated electrical signal 118 to account for different data rates of the phase-modulated optical signal 110 and/or a data rate that can vary over time and/or different modulation formats.

There are many possible techniques for the optical path length adjuster 136 to control the optical path length of the optical resonator 102. For example, the optical path length adjuster 136 can include a heater that is thermally coupled to the optical resonator 102. As current flows through the heater, the optical resonator 102 rises in temperature, and an optical path length of the optical resonator 102 increases. Other suitable techniques can also be used to control an optical path length of the optical resonator 102, including techniques based on the piezoelectric effect, pressure, electro-optic effects, and others.

In a second function, the control signal detector 132 can generate a steering control signal 138 based on detected signal values 140 from the elements of the control signal detector 132. A steering element 142 can controllably steer the incident beam toward the beamsplitter 124, based at least in part on the steering control signal 138, to maintain alignment of the incident beam. Such steering of the incident beam can that the incident beam remains aligned at the optical resonator 102 during operation of the demodulator 100. The steering element 142 can include a mirror, a prism, or another suitable element that can redirect a light beam.

To maintain alignment of the incident beam at the optical resonator 102, the steering element 142 can include an actuator 144, which can controllably pivot the steering element 142 in two dimensions about a pivot point 146. The actuator 144 can include two pistons, each of which can pivot the steering element 142 in one of the two dimensions. For example, one piston can pivot the steering element 142 in a horizontal direction, while the other piston can pivot the steering element 142 in a vertical direction. For a control signal detector 132 that is a quadrant detector, the quadrant detector can have its detector elements oriented horizontally and vertically, such as with a top-left element, a bottom-left element, a top-right-element, and a bottom-right element. The quadrant detector can generate a horizontal steering control signal by summing signals from the top-left element and the bottom-left element and subtracting a sum of signals from the top-right element and the bottom-right element. The quadrant detector can generate a vertical steering control signal by summing signals from the top-left element and the top-right element and subtracting a sum of signals from the bottom-left element and the bottom-right element. The horizontal steering control signal can drive a horizontally-oriented piston in the actuator 144, and the vertical steering control signal can drive a vertically-oriented piston in the actuator 144. Together, the horizontal and vertical steering control signals and pistons can dynamically maintain an alignment of the incident beam at the optical resonator 102 during operation of the demodulator 100. Such alignment can coincide with maintaining an alignment the beam incident on the respective data detector. Other suitable orientations and error signals can also be used.

Because the alignment function of the steering element 142 and the control signal detector 132 can function as a mechanical servo system, the bandwidth of such a mechanical servo system can be relatively low, compared to the data rate. For example, such a mechanical servo system can have a bandwidth on the order of 1 kHz, while the data rate can be on the order of 1 GHz. Having such a low bandwidth can allow the control signal detector 132 to be relatively large, such that additional focusing optics may not be needed between the beamsplitter 124 and the control signal detector 132. In general, the beam size at the control signal detector 132 can be smaller than the control signal detector 132 but larger than a spacing between elements of the control signal detector 132.

Figure 2:
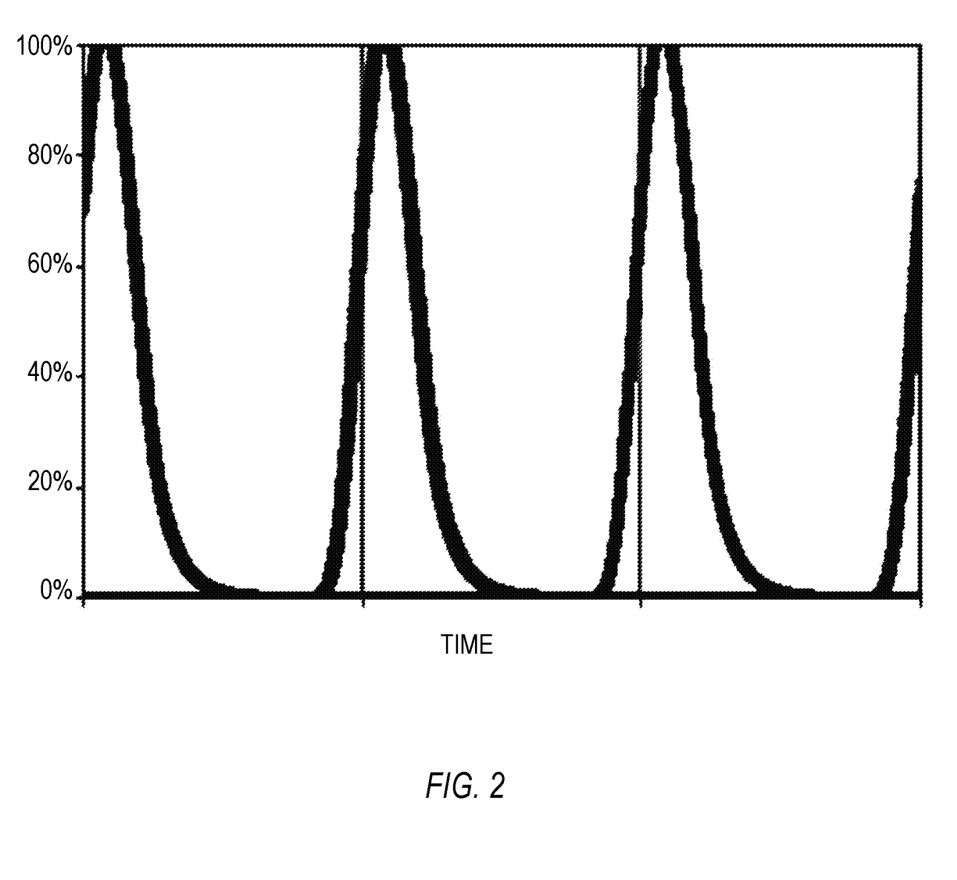
FIG. 2 shows a plot of a calculated intensity-modulated electrical signal, for the demodulator of FIG. 1, using signal generated from the data detector in a reflected path from the optical resonator.

FIG. 2 shows a plot of a calculated intensity-modulated electrical signal 118, for the demodulator 100 of FIG. 1, using signal generated from the data detector 116 in a reflected path from the optical resonator 102. Specifically, in this reflected path, the phase-modulated optical signal 110 is received through the first surface 104 of the optical resonator 102 and the fraction of the resonant optical signal energy 112 is directed out of the optical resonator 102 through the first surface 104 of the optical resonator 102.

The horizontal axis is time, the vertical axis is signal voltage or signal current, in arbitrary units. The vertical lines represent times at which the signal voltage or signal current crosses a threshold value, which in this example is 70% of the maximum value. Other suitable thresholds can also be used. The calculated steady-state electrical signal is 0% or substantially 0% for the demodulator 100 of FIG. 1. A contrast, defined as (maximum electrical signal minus minimum electrical signal), divided by (maximum electrical signal plus minimum electrical signal), can equal (100%−0%)/(100%+0%), or 1 or substantially 1.

It is possible to generate the data signal differently from the technique described above. In this alternate configuration, the demodulator 100 of FIG. 1 can optionally include a second data detector 148 located in a transmitted optical path 154 from the optical resonator 102. Specifically, in this transmitted optical path 154, the phase-modulated optical signal 110 is received through the first surface 104 of the optical resonator 102 and the fraction of the resonant optical signal energy 112 is directed out of the optical resonator 102 through the second surface 106 (rather than the first surface 104) of the optical resonator 102. The demodulator 100 can optionally further include a second focusing lens 150 located in an optical path between the second surface 106 of the optical resonator 102 and the second data detector 148, to focus the portion of the intensity-modulated optical signal 114 onto the second data detector 148. Generating an intensity-modulated electrical signal 152 using the second data detector 148, rather than the data detector 116, can produce the following simulated results.

Figure 3:
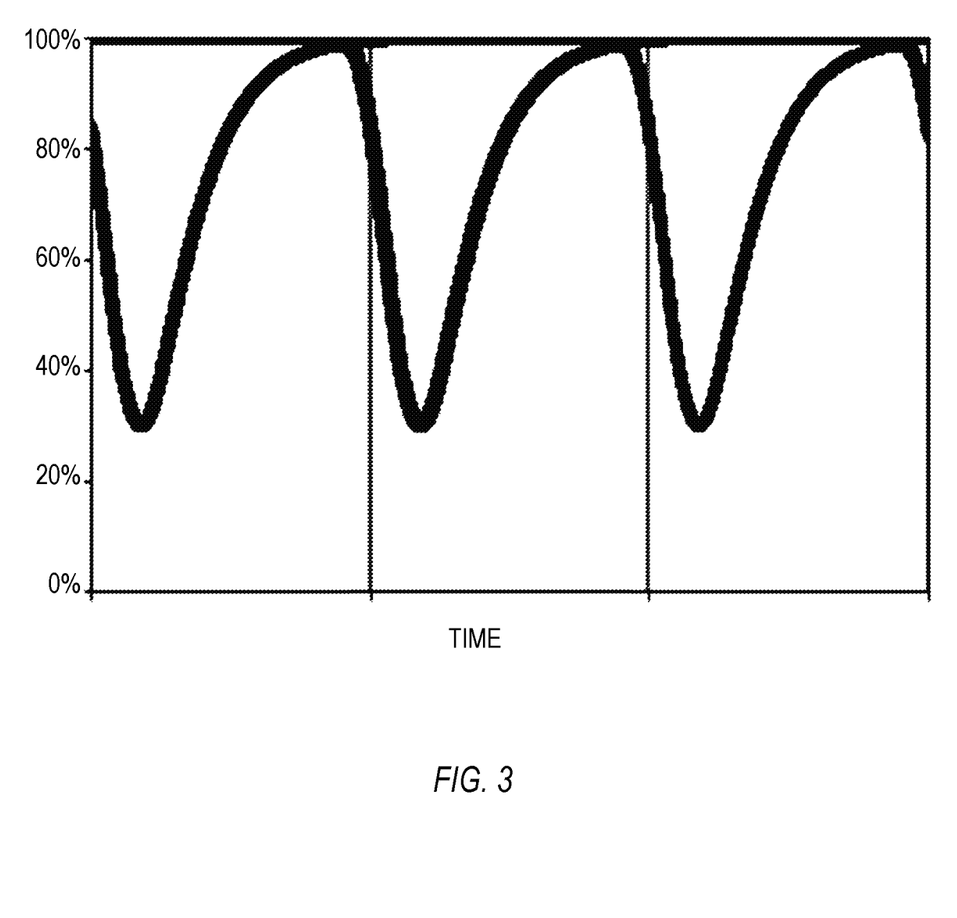
FIG. 3 shows a plot of a calculated intensity-modulated electrical signal, for the demodulator of FIG. 1, using signal generated from the second data detector in a transmitted path from the optical resonator.

FIG. 3 shows a plot of a calculated intensity-modulated electrical signal 152, for the demodulator 100 of FIG. 1, using signal generated from the second data detector 148 in a transmitted path from the optical resonator 102. Specifically, in this transmitted path, the phase-modulated optical signal 110 is received through the first surface 104 of the optical resonator 102 and the fraction of the resonant optical signal energy 112 is directed out of the optical resonator 102 through the second surface 106 of the optical resonator 102.

The horizontal axis is time, the vertical axis is signal voltage or signal current, in arbitrary units. The vertical lines represent times at which the signal voltage or signal current crosses a threshold value, which in this example is 80% of the maximum value. Other suitable thresholds can also be used. The calculated steady-state electrical signal is 100% or substantially 100% for the demodulator 100 of FIG. 1, using signal generated only from the second data detector 148 in a transmitted path from the optical resonator 102. During transient events, the electrical signal drops to about 30% of the peak value. Here, the contrast, defined as (maximum electrical signal minus minimum electrical signal), divided by (maximum electrical signal plus minimum electrical signal), can equal (100%−30%)/(100%+30%), or about 0.54.

It is beneficial to contrast the two techniques for using a single data detector in the demodulator 100 of FIG. 1.

When using signal generated only from the data detector 116 (e.g. in a reflection mode), the steady-state electrical signal can be zero or essentially zero, and the transient signal can increase the signal to a non-zero level. This zero or essentially zero background signal can provide a relatively high contrast for the signal, which in turn can provide a relatively high signal-to-noise ratio for the electrical signal.

In contrast, when using signal generated only from the second data detector 148 (e.g., in a transmission mode), the steady-state electrical signal can be 100% or essentially 100%, and the transient signal can partially decrease the signal to a level above zero. Because both the steady-state and transient values are both above zero for the transmission mode, the contrast for the transmission mode can be less than the reflection mode. As a result, the signal-to-noise ration can be higher for the reflection mode than the transmission mode.

It is also possible to use both the data detector 116 and the second data detector 148 in a detection scheme, although doing so may provide a contrast that is less than using just the single data detector 116 in the reflection mode.

Figure 4:
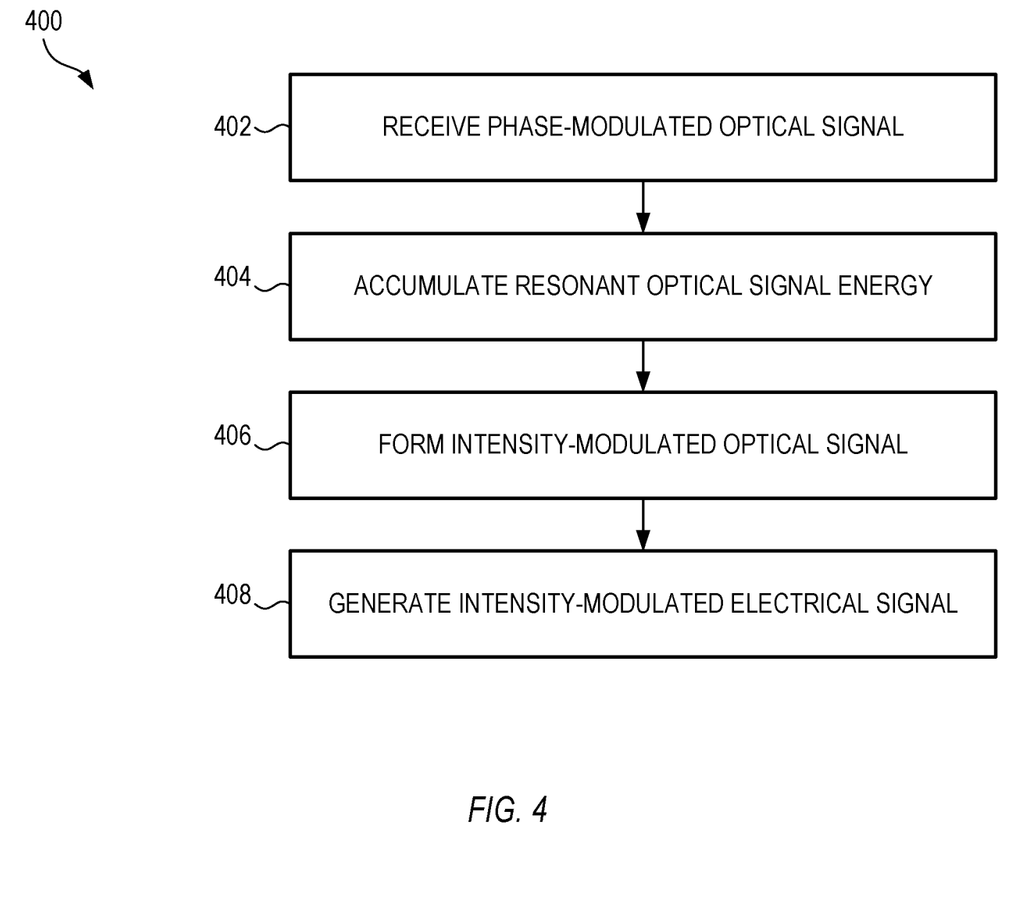
FIG. 4 shows an example of a method for demodulating a phase-modulated optical signal that has a time-varying phase, in accordance with some embodiments.

FIG. 4 shows an example of a method for demodulating a phase-modulated optical signal that has a time-varying phase, in accordance with some embodiments. The method can be executed on the demodulator 100 of FIG. 1, or on another suitable demodulator 100. Other suitable methods for demodulating can also be used.

At operation 402, the demodulator, such as 100, can receive the phase-modulated optical signal through a partially reflective first surface of an optical resonator. The optical resonator can include a resonant cavity that extends between the first surface and an at least partially reflective second surface.

At operation 404, the demodulator, such as 100, can accumulate resonant optical signal energy inside the resonant cavity based at least in part on the phase-modulated optical signal.

At operation 406, the demodulator, such as 100, can direct a fraction of the resonant optical signal energy out of the resonant cavity through the first surface to form an intensity-modulated optical signal that has a time-varying intensity that corresponds to the time-varying phase of the phase-modulated optical signal.

At operation 408, the demodulator, such as 100, can receive at least a portion of the intensity-modulated optical signal with a data detector and, in response, generate an intensity-modulated electrical signal that has a time-varying intensity that corresponds to the time-varying phase of the phase-modulated optical signal.

In some examples, accumulating the resonant optical signal energy can include causing an intensity of the intensity-modulated optical signal to approach a steady-state intensity value, varying the intensity of the intensity-modulated optical signal away from the steady-state intensity value in response to a variation in the phase of the phase-modulated optical signal, and, after the phase of the phase-modulated optical signal has varied, causing the intensity-modulated optical signal to approach the steady-state intensity value.

In some examples, the method 400 can optionally further include receiving at least a portion of the intensity-modulated electrical signal with detection circuitry, and identifying the variation in the phase of the phase-modulated optical signal, with the detection circuitry, based at least in part on the time-varying intensity of the intensity-modulated electrical signal.

EXAMPLES

To further illustrate the device, related system, and/or related method discussed herein, a non-limiting list of examples is provided below. Each of the following non-limiting examples can stand on its own or can be combined in any permutation or combination with any one or more of the other examples.

In Example 1, a demodulator can include: an optical resonator comprising a resonant cavity that extends between a first surface that is partially reflective and a second surface that is at least partially reflective, the optical resonator configured to: receive, through the first surface, a phase-modulated optical signal that has a time-varying phase; accumulate resonant optical signal energy inside the resonant cavity based at least in part on the phase-modulated optical signal; and direct, through the first surface, a fraction of the resonant optical signal energy out of the resonant cavity to form an intensity-modulated optical signal that has a time-varying intensity that corresponds to the time-varying phase of the phase-modulated optical signal; and a data detector configured to receive at least a portion of the intensity-modulated optical signal and, in response, generate an intensity-modulated electrical signal that has a time-varying intensity that corresponds to the time-varying phase of the phase-modulated optical signal.

In Example 2, the demodulator of Example 1 can optionally be configured such that the optical resonator is further configured to: cause an intensity of the intensity-modulated optical signal to approach a steady-state intensity value; vary the intensity of the intensity-modulated optical signal away from the steady-state intensity value in response to a variation in the phase of the phase-modulated optical signal; and after the phase of the phase-modulated optical signal has varied, cause the intensity-modulated optical signal to approach the steady-state intensity value.

In Example 3, the demodulator of any one of Examples 1-2 can optionally further include detection circuitry configured to: receive at least a portion of the intensity-modulated electrical signal; and identify the variation in the phase of the phase-modulated optical signal based at least in part on the time-varying intensity of the intensity-modulated electrical signal.

In Example 4, the demodulator of any one of Examples 1-3 can optionally be configured such that the detection circuitry is configured to apply threshold detection to the intensity-modulated electrical signal to determine a data stream that has been encoded on the phase-modulated optical signal.

In Example 5, the demodulator of any one of Examples 1-4 can optionally be configured such that the resonant cavity has a round-trip optical path length that is not a multiple of a wavelength of the phase-modulated optical signal.

In Example 6, the demodulator of any one of Examples 1-5 can optionally be configured such that the round-trip target path length value differs from a multiple of the wavelength of the incident beam by less than about three-eighths of the wavelength.

In Example 7, the demodulator of any one of Examples 1-6 can optionally be configured such that the round-trip target path length value differs from a multiple of the wavelength of the incident beam by about one-fourth of the wavelength.

In Example 8, the demodulator of any one of Examples 1-7 can optionally be configured such that the resonant cavity has a round-trip optical path length that is about a multiple of a wavelength of the phase-modulated optical signal.

In Example 9, the demodulator of any one of Examples 1-8 can optionally further include a beamsplitter configured to: receive an incident beam; direct a first portion of the incident beam to the optical resonator as the phase-modulated optical signal; and direct a second portion of the incident beam to a control signal detector, the control signal detector having a bandwidth that is less than a bandwidth of the data detector.

In Example 10, the demodulator of any one of Examples 1-9 can optionally be configured such that the control signal detector is configured to generate an optical path length control signal that corresponds to a total optical power incident on the control signal detector; and can further include an optical path length adjuster configured to control an optical path length of the resonant cavity, based at least in part on the optical path length control signal.

In Example 11, the demodulator of any one of Examples 1-10 can optionally be configured such that the control signal detector is a multi-element detector.

In Example 12, the demodulator of any one of Examples 1-11 can optionally be configured such that the control signal detector is configured to generate a steering control signal based on detected signal values from the elements of the multi-element detector; and can further include a steering element configured to controllably steer the incident beam toward the beamsplitter, based at least in part on the steering control signal, to maintain alignment of the incident beam with respect to the optical resonator.

In Example 13, the demodulator of any one of Examples 1-12 can optionally be configured such that the multi-element detector is a quadrant detector.

In Example 14, the demodulator of any one of Examples 1-13 can optionally be configured such that the optical resonator comprises an etalon.

In Example 15, a method for demodulating a phase-modulated optical signal that has a time-varying phase can include: receiving the phase-modulated optical signal through a partially reflective first surface of an optical resonator, the optical resonator including a resonant cavity that extends between the first surface and an at least partially reflective second surface; accumulating resonant optical signal energy inside the resonant cavity based at least in part on the phase-modulated optical signal; directing a fraction of the resonant optical signal energy out of the resonant cavity through the first surface to form an intensity-modulated optical signal that has a time-varying intensity that corresponds to the time-varying phase of the phase-modulated optical signal; and receiving at least a portion of the intensity-modulated optical signal with a data detector and, in response, generating an intensity-modulated electrical signal that has a time-varying intensity that corresponds to the time-varying phase of the phase-modulated optical signal.

In Example 16, the method of Example 15 can optionally be configured such that accumulating the resonant optical signal energy comprises: causing an intensity of the intensity-modulated optical signal to approach a steady-state intensity value; varying the intensity of the intensity-modulated optical signal away from the steady-state intensity value in response to a variation in the phase of the phase-modulated optical signal; and after the phase of the phase-modulated optical signal has varied, causing the intensity-modulated optical signal to approach the steady-state intensity value.

In Example 17, the method of any one of Examples 15-16 can optionally further include: applying threshold detection to the intensity-modulated electrical signal to determine a data stream that has been encoded on the phase-modulated optical signal.

In Example 18, a demodulator can include: an optical resonator comprising a resonant cavity that extends between a first surface that is partially reflective and a second surface that is at least partially reflective, the optical resonator configured to: receive, through the first surface, a phase-modulated optical signal that has a time-varying phase; accumulate resonant optical signal energy inside the resonant cavity based at least in part on the phase-modulated optical signal; cause the resonant optical signal energy to approach a steady-state energy value; vary the resonant optical signal energy away from the steady-state energy value in response to a variation in the phase of the phase-modulated optical signal; direct, through the first surface, a fraction of the resonant optical signal energy out of the resonant cavity to form an intensity-modulated optical signal that has a time-varying intensity that corresponds to the time-varying phase of the phase-modulated optical signal; and after the phase of the phase-modulated optical signal has varied, resonant optical signal energy to approach a steady-state energy value; a data detector configured to receive at least a portion of the intensity-modulated optical signal and, in response, generate an intensity-modulated electrical signal that has a time-varying intensity that corresponds to the time-varying phase of the phase-modulated optical signal; and detection circuitry configured to: receive at least a portion of the intensity-modulated electrical signal; and identify the variation in the phase of the phase-modulated optical signal based at least in part on the time-varying intensity of the intensity-modulated electrical signal.

In Example 19, the demodulator of Example 18 can optionally further include: a beamsplitter configured to: receive an incident beam; direct a first portion of the incident beam to the optical resonator as the phase-modulated optical signal; and direct a second portion of the incident beam to a control signal detector, the control signal detector having a bandwidth that is less than a bandwidth of the data detector, the control signal detector being configured to generate an optical path length control signal that corresponds to a total optical power incident on the control signal detector; and an optical path length adjuster configured to: control an optical path length of the resonant cavity, based at least in part on the optical path length control signal; and adjust the optical path of the resonant cavity to approach a round-trip target path length value that is a multiple of a wavelength of the incident beam.

In Example 20, the demodulator of any one of Examples 18-19 can optionally be configured such that the detection circuitry is configured to apply threshold detection to the intensity-modulated electrical signal to determine a data stream that has been encoded on the phase-modulated optical signal.

What is claimed is:
1. A demodulator, comprising:
an optical resonator comprising a resonant cavity that extends between a first surface that is partially reflective and a second surface that is at least partially reflective, the optical resonator configured to:

receive, through the first surface, a phase-modulated optical signal that has a time-varying phase;

accumulate resonant optical signal energy inside the resonant cavity based at least in part on the phase-modulated optical signal; and direct, through the first surface, a fraction of the resonant optical signal energy out of the resonant cavity to form an intensity-modulated optical signal that has a time-varying intensity that corresponds to the time-varying phase of the phase-modulated optical signal;

a data detector configured to receive at least a portion of the intensity-modulated optical signal and, in response, generate an intensity-modulated electrical signal that has a time-varying intensity that corresponds to the time-varying phase of the phase-modulated optical signal; and detection circuitry configured to:
receive at least a portion of the intensity-modulated electrical signal; and
identify a variation in the time-varying phase of the phase-modulated optical signal based at least in part on the time-varying intensity of the intensity-modulated electrical signal.

2. The demodulator of claim 1, wherein the optical resonator is further configured to:
cause an intensity of the intensity-modulated optical signal to approach a steady-state intensity value;
vary the intensity of the intensity-modulated optical signal away from the steady-state intensity value in response to the variation in the time-varying phase of the phase-modulated optical signal; and
after the phase of the phase-modulated optical signal has varied, cause the intensity-modulated optical signal to approach the steady-state intensity value.

3. The demodulator of claim 1, wherein the detection circuitry is configured to apply threshold detection to the intensity-modulated electrical signal to determine a data stream that has been encoded on the phase-modulated optical signal.

4. The demodulator of claim 1, wherein the resonant cavity has a round-trip optical path length that is not a multiple of a wavelength of the phase-modulated optical signal.

5. The demodulator of claim 4, wherein the round-trip target path length value differs from a multiple of the wavelength of the incident beam by less than about three-eighths of the wavelength.

6. The demodulator of claim 5, wherein the round-trip target path length value differs from a multiple of the wavelength of the incident beam by about one-fourth of the wavelength.

7. The demodulator of claim 1, wherein the resonant cavity has a round-trip optical path length that is about a multiple of a wavelength of the phase-modulated optical signal.

8. The demodulator of claim 1, further comprising a beamsplitter configured to:
receive an incident beam;
direct a first portion of the incident beam to the optical resonator as the phase-modulated optical signal; and
direct a second portion of the incident beam to a control signal detector, the control signal detector having a bandwidth that is less than a bandwidth of the data detector.

9. The demodulator of claim 8;
wherein the control signal detector is configured to generate an optical path length control signal that corresponds to a total optical power incident on the control signal detector; and
further comprising an optical path length adjuster configured to control an optical path length of the resonant cavity, based at least in part on the optical path length control signal.

10. The demodulator of claim 1, wherein the control signal detector is a multi-element detector.

11. The demodulator of claim 10,
wherein the control signal detector is configured to generate a steering control signal based on detected signal values from the elements of the multi-element detector; and
further comprising a steering element configured to controllably steer the incident beam toward the beamsplitter, based at least in part on the steering control signal, to maintain alignment of the incident beam with respect to the optical resonator.

12. The demodulator of claim 10, wherein the multi-element detector is a quadrant detector.

13. The demodulator of claim 1, wherein the optical resonator comprises an etalon.

14. A method for demodulating a phase-modulated optical signal that has a time-varying phase, the method comprising:
receiving the phase-modulated optical signal through a partially reflective first surface of an optical resonator, the optical resonator including a resonant cavity that extends between the first surface and an at least partially reflective second surface;
accumulating resonant optical signal energy inside the resonant cavity based at least in part on the phase-modulated optical signal;
directing a fraction of the resonant optical signal energy out of the resonant cavity through the first surface to form an intensity-modulated optical signal that has a time-varying intensity that corresponds to the time-varying phase of the phase-modulated optical signal;
receiving at least a portion of the intensity-modulated optical signal with a data detector and, in response, generating an intensity-modulated electrical signal that has a time-varying intensity that corresponds to the time-varying phase of the phase-modulated optical signal;
receiving, with detection circuitry, at least a portion of the intensity-modulated electrical signal; and
identifying, with the detection circuitry, a variation in the time-varying phase of the phase-modulated optical signal based at least in part on the time-varying intensity of the intensity-modulated electrical signal.

15. The method of claim 14, wherein accumulating the resonant optical signal energy comprises:
causing an intensity of the intensity-modulated optical signal to approach a steady-state intensity value;
varying the intensity of the intensity-modulated optical signal away from the steady-state intensity value in response to the variation in the time-varying phase of the phase-modulated optical signal; and
after the phase of the phase-modulated optical signal has varied, causing the intensity-modulated optical signal to approach the steady-state intensity value.

16. The method of claim 14, further comprising:
applying threshold detection to the intensity-modulated electrical signal to determine a data stream that has been encoded on the phase-modulated optical signal.

17. A demodulator, comprising:
an optical resonator comprising a resonant cavity that extends between a first surface that is partially reflective and a second surface that is at least partially reflective, the optical resonator configured to:
receive, through the first surface, a phase-modulated optical signal that has a time-varying phase;
accumulate resonant optical signal energy inside the resonant cavity based at least in part on the phase-modulated optical signal;
cause the resonant optical signal energy to approach a steady-state energy value;
vary the resonant optical signal energy away from the steady-state energy value in response to a variation in the time-varying phase of the phase-modulated optical signal;
direct, through the first surface, a fraction of the resonant optical signal energy out of the resonant cavity to form an intensity-modulated optical signal that has a time-varying intensity that corresponds to the time-varying phase of the phase-modulated optical signal; and
after the phase of the phase-modulated optical signal has varied, resonant optical signal energy to approach a steady-state energy value;
a data detector configured to receive at least a portion of the intensity-modulated optical signal and, in response, generate an intensity-modulated electrical signal that has a time-varying intensity that corresponds to the time-varying phase of the phase-modulated optical signal; and
detection circuitry configured to:
receive at least a portion of the intensity-modulated electrical signal; and
identify the variation in the phase of the phase-modulated optical signal based at least in part on the time-varying intensity of the intensity-modulated electrical signal.

18. The demodulator of claim 17, further comprising:
a beamsplitter configured to:
receive an incident beam;
direct a first portion of the incident beam to the optical resonator as the phase-modulated optical signal; and
direct a second portion of the incident beam to a control signal detector, the control signal detector having a bandwidth that is less than a bandwidth of the data detector, the control signal detector being configured to generate an optical path length control signal that corresponds to a total optical power incident on the control signal detector; and
an optical path length adjuster configured to:
control an optical path length of the resonant cavity, based at least in part on the optical path length control signal; and
adjust the optical path of the resonant cavity to approach a round-trip target path length value that is a multiple of a wavelength of the incident beam.

19. The demodulator of claim 17, wherein the detection circuitry is configured to apply threshold detection to the intensity-modulated electrical signal to determine a data stream that has been encoded on the phase-modulated optical signal.

* * * * *

UNITED STATES PATENT AND TRADEMARK OFFICE
CERTIFICATE OF CORRECTION

PATENT NO. : 11,199,754 B2  
APPLICATION NO. : 16/903129  
DATED : December 14, 2021  
INVENTOR(S) : Kowalevicz et al.

Page 1 of 1

It is certified that error appears in the above-identified patent and that said Letters Patent is hereby corrected as shown below:

In the Claims

In Column 14, Line 1, in Claim 9, delete "claim 8;" and insert --claim 8,-- therefor In Column 14, Line 10, in Claim 10, delete "claim 1," and insert --claim 9,-- therefor Signed and Sealed this  
Eighth Day of February, 2022

Drew Hirshfeld  
*Performing the Functions and Duties of the*  
*Under Secretary of Commerce for Intellectual Property and*  
*Director of the United States Patent and Trademark Office*